March 27, 1928.
C. CLAUS
1,664,189
SELF ALIGNING BEARING STRUCTURE AND METHOD OF MAKING SAME
Filed May 19, 1926
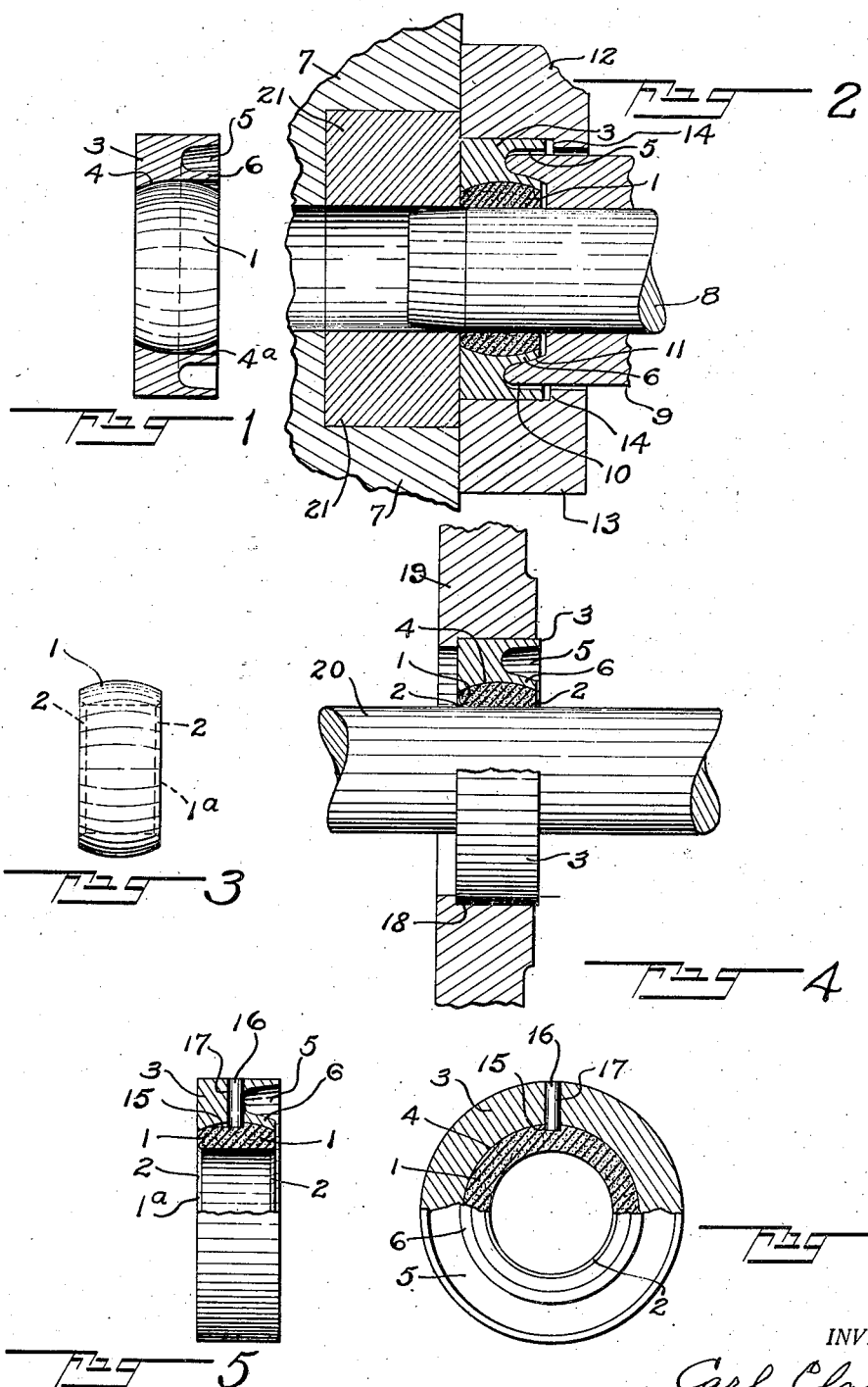
INVENTOR.
Carl Claus
BY Willis Fowler
ATTORNEYS.

Patented Mar. 27, 1928.

1,664,189

UNITED STATES PATENT OFFICE.

CARL CLAUS, OF PLAINFIELD, NEW JERSEY, ASSIGNOR TO BOUND BROOK OIL-LESS BEARING COMPANY, OF BOUNDBROOK, NEW JERSEY, A CORPORATION OF NEW JERSEY.

SELF-ALIGNING BEARING STRUCTURE AND METHOD OF MAKING SAME.

Application filed May 19, 1926. Serial No. 110,118.

This invention relates in general to a self-aligning bearing construction and a method of making the same; the general type of construction being that known as ball and socket form. A general object of the invention is to provide an annular bearing-member which is adapted to adjust itself on its seat in a housing to thereby permit adjustment and alignment of a shaft mounted in the bearing-member. A further object of the invention is to provide this type of bearing-construction with a self-lubricating bearing-member, which dispenses with the application of lubricating-oil after installation. Still another object in view is the provision of a simple and secure construction and arrangement of the bearing-member housing and the method of finally assembling the two in operative relation.

The invention includes the provision of a bearing-member in which a shaft may be journaled, the bearing-member having an external circumferential ridge formed thereon arranged to have arcuate contact with a complementary grooved seat formed in the surrounding housing. The arcuate surfaces are in the form of sections of the surface of a sphere, so that the bearing-member may rock on its seat to provide for the alignment of the shaft in the bearing unit; but the arcuate seat in the bearing housing is not completely formed until the bearing-member has been inserted in the half formed seat through the unformed or open end of the housing, whereupon such open end is then contracted or pressed inwardly around the adjacent end of the bearing-member in complete conformity with the curved contacting surface thereof.

Still another feature of the invention resides in forming the open end of the seat in the housing with a comparatively thin and bendable lip, which may be readily pressed inwardly against the adjacent portion of the exterior curved surface of the bearing-member to form the finished seat with a true and smooth surface.

Heretofore, the use of ball-bearings, which are expensive and comparatively complicated in structure, have been resorted to in many instances principally on account of their capacity to yield or rock slightly under the tipping movements of the shaft out of the axial line and permit it to be maintained in alignment automatically. My improved bearing construction, which has ample yielding and rocking capacity in keeping the shaft in alignment, is used to take the place of the more expensive ball-bearing structure under the stated requirements and in such replacement it has been found to be highly efficient and satisfactory, and this is an important advantage on account of the comparative simplicity of my device and its low cost of production.

There are other features of the invention both in connection with the device and its method of manufacture, which will appear from the more detailed description hereinafter given.

I have illustrated a type of my inventions in the accompanying drawings, wherein:

Fig. 1, shows a self-lubricating self-aligning bearing structure embodying my improvements, the housing of the structure being shown in central vertical section with its outer end open for the insertion of the bearing-member into its seat; the said bearing-member being shown in elevation.

Fig. 2, shows parts of an assembling press or apparatus acting upon the open end of the housing to close it around the contained bearing-member, the two latter members being shown in central vertical section.

Fig. 3, shows a side elevation of the composite bearing-member, detached.

Fig. 4, shows my improved bearing structure mounted in a support or frame with a shaft journaled in the bearing-member, parts of the view being in central vertical section and parts in elevation.

Figs. 5 and 6, show respectively a side and an end view of a slightly modified form of the structure, with the upper part of each view in central vertical section and the lower part in elevation.

Referring to the drawings for a more detailed description, 1 indicates a tubular bearing member or shell having a cylindrical bore for the reception of a shaft and with its periphery formed with a convex spherical ridge 2, the center of the curvature of which is the axis of the bearing. This annulus is made of a composition of metals and lubricating material, as hereinafter described, though it may be made otherwise.

The housing 3, is a ring-shaped member having its interior formed with a rounded groove providing a seat 4, the arcuate concavity of which conforms to the convex peripheral zone 2, of the bearing-member and the curvature of the seat is likewise struck from the axis of the bearing structure.

The annular housing part 3, is formed with one end of its internal seat 4, finished with its proper curvature while the other end of the seat at 4ª, is left straight or open to permit of the bearing-member being inserted endwise through said straight part, into its place in the housing, after which the straight part is bent or pressed inwardly to contract and close it around the adjacent portion of the exterior of the bearing-member, as shown in Figs. 2, 4 and 5. When thus assembled, the bearing-member is confined in its seat within the housing-member in operative position and has the capacity of shifting out of the plane normal to the axis of the bearing structure so that the contained shaft may shift itself in any direction.

The side of the housing-member 3, where the open end is located, is formed with an annular recess 5, so as to provide a wall or lip 6, around the mouth of said end, and which lip may be readily forced or pressed inwardly against the adjacent part of the bearing-member so as to complete the curved surface of the seat 4. This lip or wall 6, is integral with the body of the housing part and its thickness may vary in accordance with the hardness or pliability of the material used, but it should be thick enough to serve its purpose of forming part of the seat at the same time be easily pressed or bent into place. The housing, may be made from a suitable bronze metal or machine steel and it can be die-pressed or cast from such material with the open ended seat accurately formed in its interior ready for the reception of the annular bearing-member, and the exterior recess 5, formed in its end to provide the bendable lip 6. The final pressing of the lip 6, to complete the seat for the bearing-member must be accomplished, without, of course, puckering or cracking the material of the housing lip, in order to provide a true and smooth surface for the seat.
The bearing and housing members may be easily put together in operative relation by means of the assembling die which I herewith show and which comprises a sleeve 21, set in the frame 7, level with the surface thereof and into which enters a reciprocating mandrel 8, with a sliding fit. An annular die 9, surrounds the mandrel with a sliding fit and its active face is provided with a concentric flange 10, the inner surface of which is sloped inwardly with a slight curvature, as indicated at 11, so that the flange tapers in cross-section. This flange is about the depth of the groove or recess 5, formed in the outer side of the housing-member 3, and is accurately de-
signed to engage the exterior of the lip 6, of the housing upon entering the groove in the die pressing operation, and to force the lip inwardly into its final position at the end of the stroke of the die, as indicated in Fig. 2. Guide and stripper blocks or plates 12 and 13, having a shoulder 14, for engaging the housing-member, are disposed upon the frame at opposite sides of the path of movement of the die and are designed to receive the assembled members between them during the die operation as it presses the housing into final shape, and then to strip the finished structure from the die as the latter is withdrawn. The mandrel is moved into the bore of the bearing-member as the die presses the housing and serves to preserve the interior diameter of the bearing under the action of the press and prevent possible rupture of the composite material. The die and mandrel may be reciprocated by any well known form of mechanism which it is not deemed necessary to here illustrate. The bearing member is beveled at 1ª, to guide the entrance of the mandrel therein and prevent mutilation of the member.

In making this type of self-aligning bearing, I have used for the material of the annular member 1, a compressed composition of various different metals formed from a mixture of several metals finely divided, with or without an admixture of graphite. For example, a mixture of finely divided copper and tin, may be used, or these two metals with either lead or zinc added, and with any of said groups, graphite may be added to compose the material, which is not limited to any particular group of metals. The selected granular materials are then compressed with comparatively heavy pressure into a consolidated coherent mass and the body thus formed is heat treated so as to produce a firm porous structure ready to be used as bearing material and which may be soaked with lubricating oil if desired, as it has considerable capacity for absorbing oil.

In thus making the self-lubricating bearing-member 1, I have employed the apparatus shown in my application for patent, filed October 26, 1923, Serial No. 671,032, by means of which the dies not only give the final shape or form to the material, but also act upon the same with opposite pressures whereby a novel result is brought about.
The bearing blank thus formed is then sized to final dimensions and this may be done by my improved apparatus which forms the subject of another application for patent of mine, filed on even date herewith.
It will be noted in thus making the bearing-member 1, from compressed powdered materials, the important advantage is gained of securing perfect accuracy and trueness of both the interior bore and the exterior spherical periphery which must fit perfectly the concave seat in the housing. By my improvements this is accomplished without the usual expensive machining of the parts and at the same time the bearing is self-lubricating. The annular bearing member, as it comes from my improved sizing apparatus, is accurately dimensioned both as to diameters exterior and interior, as well as the length of the member.

While the assembling of the bearing-member in its housing is done with sufficient force to cause the seat for the bearing to grip the periphery thereof tightly enough to prevent the bearing from turning on its own axis, the additional precaution may be taken to avoid this, by arranging a pin and a slot connection between the bearing and housing, as shown in Figs. 5 and 6, wherein the bearing member has its periphery provided with a slot 15, extending transversely thereof for something over half the width of the member, so as to receive the end of the locking-pin 16, which extends down through a hole 17, in the housing. The pin 16, takes into the slot as the bearing is entered sidewise in its seat, and thus locks the bearing and housing together against a turning movement of the bearing on its axis, at the same time permitting the bearing to have full capacity in its rocking or tilting movement in its self alignment.

From the foregoing, it will be readily understood that the housing member 3, being first formed with one end of its interior seat 4, completely finished as to curvature, while the other end is left open or straight in an intermediate stage of formation to permit of the finished bearing-member being pushed endwise through the same into its seat. The two members are then placed in the assembling press, as above described, and the die is brought into action and presses the lip of the housing into final position to complete that side of the seat 4, while at the same time the mandrel enters the bore of the bearing-member to keep it true in dimension and to prevent any possible fracture of the composite bearing material of which it is made.

In Fig. 4, I show the finished bearing structure mounted in a recess 18, in a frame or bracket 19, and with a shaft 20, journaled in the bearing-member. The recess 18, is formed with a diameter equal to that of the exterior of the housing 3, which is forced or driven therein.

When the bearing-member 1 is made of compressed composition, it is preferable to form the bore with beveled edges as at $1^a$, to permit the mandrel to be easily guided into the bore without chipping or injuring the edge of the same as might otherwise happen.

Having thus described my invention, what I claim and desire to secure by Letters Patent is:—

1. In a self-aligning bearing structure, a bushing in which a shaft may be journaled, a cylindrical housing provided with a circular seat in which said bushing is mounted and an annular slot in one end thereof, the engaged portions of said bushing and the housing being rounded whereby the bushing may rock in its seat to conform to the alignment of the shaft, the said seat in the housing having one end portion thereof normally shaped in conformity with the curvature of said seat and the other end portion between the seat and the annular slot formed substantially straight to permit the insertion of said bushing in its seat and be pressed around the adjacent end of said bushing so as to finally conform that portion of the seat to said bushing.

2. In a self-aligning bearing structure, a bushing in which a shaft may be mounted, a ring-shaped housing provided with a cylindrical exterior and an annular slot in one of its ends coaxial with a seat in the center thereof in which said bushing is mounted, the engaged surfaces of said bushing and housing being spherically curved about the center of the bearing structure whereby the bushing may rock in its seat to conform to the alignment of the shaft, the said bearing seat in the housing having one end thereof normally spherically curved and the other end non-curved and such end being provided with a compressible annular lip between the seat and the annular slot and bent inwardly around the adjacent end of said bushing when the latter is seated within the housing.

In testimony whereof, I have hereunto set my hand.

CARL CLAUS.